Figure 1:
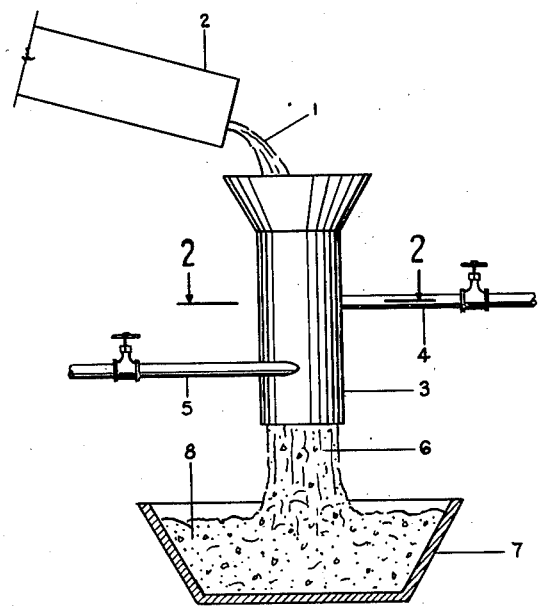

April 1, 1952  E. L. STOUT ET AL  2,590,902
PRODUCTION OF LIGHTWEIGHT AGGREGATE FROM MOLTEN SLAG
Filed April 20, 1951

Edgar L. Stout,
William C. Scott Jr., and
John M. Stinson  INVENTORS.

BY Bentley G. Morrow
Attorney.

Patented Apr. 1, 1952

2,590,902

UNITED STATES PATENT OFFICE 2,590,902

PRODUCTION OF LIGHTWEIGHT AGGREGATE FROM MOLTEN SLAG

Edgar L. Stout, Sheffield, William C. Scott, Jr., Florence, and John M. Stinson, Sheffield, Ala., assignors to Tennessee Valley Authority, a corporation of the United States Application April 20, 1951, Serial No. 222,127

3 Claims. (Cl. 49—77.5)

(Granted under the act of March 3, 1883, as amended April 30, 1928; 370 O. G. 757)

The invention herein described may be manufactured and used by or for the Government for governmental purposes without the payment to us of any royalty therefor.

This invention relates to improved methods for expanding molten slag.

Expanded or foamed slags have long been used as aggregates for lightweight concrete. It has been customary to produce such materials by introducing controlled quantities of water or steam or other inert gas into molten slag to produce a foam-like material which is then cooled in the expanded state. The cooled product is then crushed to proper size specifications for use as aggregate in concrete.

Many types of machines and processes have been suggested for expanding slag produced in iron blast furnaces. Slags from other sources, however, often differ greatly in chemical composition and in physical properties from the slags produced in iron blast furnaces, and these are often expanded with difficulty. In recent years considerable quantities of slag have been produced in electric furnaces for the reduction of phosphate rock. When attempts are made to expand such slags by methods successful with iron blast-furnace slags it is found that the products are unsatisfactory. The expansion usually is lacking in uniformity; the product may be weak, friable, and lacking in strength; or so little expansion may occur that the product cannot be considered as a lightweight expanded slag.

It is an object of this invention to provide a method whereby a strong, uniform, lightweight aggregate may be produced from phosphate reduction slag as well as from iron and blast-furnace and other slags.

Another object is to provide a method whereby substantially all the lightweight aggregate produced is uniform in density and strength.

Another object is to provide such method which may be carried out simply and cheaply and which requires a minimum of apparatus and space.

Other objects and advantages will become apparent as this disclosure proceeds.

We have found that these objects may be attained in a process which comprises continuously introducing molten slag into the top of a short substantially vertical cylindrical zone having an open bottom; controlling the rate of flow of the slag so that the cylindrical zone is kept substantially filled and so that the slag passes downward through said zone in about one second; concomitantly introducing at least one stream of water into said zone substantially tangentially thereof at a velocity sufficiently high to impart a swirling motion to the resulting emulsion-like mixture of water and molten slag in said zone; controlling the rate of flow of said water so that the walls of said zone are kept wetted by water; and continuously dropping said resulting mixture from the open bottom of said zone into a cooling zone.

Figure 2:
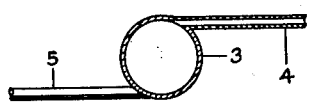

The attached drawing illustrates one form of apparatus in which our process may be carried out. In the drawing Figure 1 is a vertical part sectional of the apparatus; Figure 2 is a horizontal sectional view taken on line 2—2 of Figure 1.

In Figure 1 a stream of molten slag 1 tapped from a furnace, not shown, is introduced via slag runner 2 into cylinder 3. Valved water lines 4 and 5 are disposed so as to inject water tangentially into the stream of molten slag in the cylinder 3. The resulting emulsion-like mixture of molten slag and water is discharged from the lower end of cylinder 3 into a mixer 6. The water in the slag-water mixture 8 in the receiving vessel 7 is converted to steam by the hot slag, and the steam expands the slag. When cooled, the slag has a porous honeycomb-like structure.

Figure 2 illustrates the manner in which valved water lines 4 and 5 are disposed with respect to cylinder 3 to introduce water tangentially into the molten slag stream and to impart a swirling motion to the stream. Water must be introduced at such velocity that a rather rapid swirling motion is imparted to the slag-water mixture within the cylinder. The volume of water introduced should be such that the cylinder walls are kept continuously wetted with water. For most installations a single water inlet is sufficient to give the desired action although for larger installations, in which the diameter of the cylinder is greater than about 8 inches, two or three water inlets may be employed. Preferably the water stream is introduced horizontally into the vertically flowing slag stream. If desired, however, the water stream may be directed tangentially and downwardly at an angle of up to 45 degrees from the horizontal. The relative proportions of slag and water may be varied within rather broad limits in the operation of our process.

We have found that satisfactory lightweight aggregate may be produced with slag-to-water ratios on a weight basis of from 2.5:1 to 13:1. Best results are obtained when the ratio is between 5:1 and 10:1.

In the foregoing description we have referred to a mixture of molten slag and water discharged from cylinder 3. Actually, some steam is formed as soon as the water contacts the molten slag. However, the interval between the time the water contacts the slag and the time the slag enters the receiving vessel is very short—ordinarily less than one second. The proportion of water converted to steam in this short interval is small, and the mixture may be considered as consisting essentially of water and slag.

In order to obtain a uniform lightweight product it is necessary that the water droplets be uniformly dispersed in the molten slag in the manner of an emulsion. To accomplish this uniform dispersion of water and slag we have found that the slag must be introduced at such a rate that the cylinder is substantially full of slag and slag-water mixture, and that the water must be introduced tangentially or very nearly so. Departure from either of these conditions results in the production of a material that is too dense to be considered a lightweight aggregate.

Since the composition and physical properties of any particular slag being expanded are dependent upon the type of reaction and temperature produced in the furnace from which slag is removed, it is necessary to choose a cylinder of such size that these conditions are fulfilled. It is necessary that the slag traverse the cylinder in about one second and that it be swirled to thoroughly mix the water droplets with the slag.

The receiving vessel into which the slag-water mixture is introduced and in which expansion of the slag takes place should have a depth of at least 6 inches in order to obtain satisfactory expansion of the slag. The depth, however, should not exceed 16 inches. For installations in which the amount of slag tapped exceeds about 1000 pounds, a plurality of receiving vessels should be provided. These vessels may be a series of chill cars or a pan conveyor or the like.

*Example*

We have carried out tests of our process in a cylinder made from a 6-inch length of 2½ inch standard pipe. A 6 x 2½ inch reducer was fitted to the top of the cylinder to funnel the slag into the cylindrical zone. A single ¼-inch standard pipe was welded to the vertically mounted 2½ inch pipe so as to introduce water horizontally and tangentially into the cylinder. The center line of the water-inlet pipe was positioned 5 inches above the bottom of the cylinder. A steel pan 4 x 8 feet, by 6 inches deep, was used as the receiving vessel. The apparatus was otherwise constructed as is shown in the drawing and was operated as is described above.

Remelted phosphate-reduction furnace slag was used in these tests. The 2½ inch diameter cylinder was found to have a maximum capacity of about 200 pounds of slag per minute. When the details of operation described above were employed, it was found that the expanded product was strong and uniform in texture. Solidified products were removed from the receiving vessel and were crushed in a jaw crusher to pass a ⅜-inch screen for bulk density determination.

When slag-to-water ratios were in the range from 2.5:1 to 13:1 the bulk density of the product was found to average 50 pounds per cubic foot.

We claim as our invention:

1. A process for expanding slag, which comprises continuously introducing molten slag into the top of a short, substantially vertical cylindrical zone having an open bottom; controlling the rate of flow of the slag so that the cylindrical zone is kept substantially filled and so that the slag passes downward through said zone in about one second; concomitantly introducing at least one stream of water into said zone substantially tangentially at a velocity sufficiently high to impart a swirling motion to the resulting emulsion-like mixture of water and molten slag in said zone; controlling the rate of flow of said water so that the walls of said zone are kept wetted by water; and continuously dropping said resulting mixture from the open bottom of said zone into a cooling zone.

2. A process for expanding slag produced in smelting phosphate rock, which comprises continuously introducing such molten slag into the top of a short, substantially vertical cylindrical zone having an open bottom; controlling the rate of flow of the slag so that the cylindrical zone is kept substantially filled and so that the slag passes downward through said zone in about one second; concomitantly introducing at least one stream of water into said zone substantially tangentially at a velocity sufficiently high to impart a swirling motion to the resulting emulsion-like mixture of water and molten slag in said zone; controlling the rate of flow of said water so that the ratio of slag to water is in the range from 2.5:1 to 13:1; and continuously dropping said resulting mixture from the open bottom of said zone into a cooling zone.

3. A process for expanding slag produced in smelting phosphate rock, which comprises continuously introducing such molten slag into the top of a short, substantially vertical cylindrical zone having an open bottom; controlling the rate of flow of the slag so that the cylindrical zone is kept substantially filled and so that the slag passes downward through said zone in about one second; concomitantly introducing at least one stream of water into said zone substantially tangentially at a velocity sufficiently high to impart a swirling motion to the resulting emulsion-like mixture of water and molten slag in said zone; controlling the rate of flow of said water so that the ratio of slag to water is in the range from 2.5:1 to 10:1; continuously dropping said resulting mixture from the open bottom of said zone into a cooling zone; and therein cooling the mixture in a layer from 6 to 16 inches in thickness.

EDGAR L. STOUT.
WILLIAM C. SCOTT, Jr.
JOHN M. STINSON.

No references cited.